(12) United States Patent
Banerjee (10) Patent No.: US 12,094,315 B2
(45) Date of Patent: Sep. 17, 2024

(54) MULTI-SENSOR DEVICE FOR ENVIRONMENT STATE ESTIMATION AND PREDICTION BY SAMPLING ITS OWN SENSORS AND OTHER DEVICES

(71) Applicant: Bonny Banerjee, Collierville, TN (US)

(72) Inventor: Bonny Banerjee, Collierville, TN (US)

( * ) Notice: Subject to any disclaimer, the term of this patent is extended or adjusted under 35 U.S.C. 154(b) by 0 days.

(21) Appl. No.: 16/719,828

(22) Filed: Dec. 18, 2019

(65) Prior Publication Data

US 2020/0193793 A1 Jun. 18, 2020
US 2021/0398412 A9 Dec. 23, 2021

Related U.S. Application Data

(60) Provisional application No. 62/933,538, filed on Nov. 11, 2019, provisional application No. 62/780,973, filed on Dec. 18, 2018.

(51) Int. Cl.
*G08B 21/04* (2006.01)
*G06F 3/01* (2006.01)
(Continued)

(52) U.S. Cl.
CPC .......... *G08B 21/0453* (2013.01); *G06F 3/011* (2013.01); *G06F 3/017* (2013.01);
(Continued)

(58) Field of Classification Search
CPC ............ G08B 21/0453; G08B 21/0476; G08B 21/0469; G06N 20/00; G06N 5/045;
(Continued)

(56) References Cited

U.S. PATENT DOCUMENTS

2013/0096466 A1 4/2013 Sarrafzadeh et al.
2016/0180222 A1* 6/2016 Sierhuis ................ G06N 20/00
706/47
(Continued)

FOREIGN PATENT DOCUMENTS

EP 2790165 A1 10/2014
EP 3139313 A2 3/2017

OTHER PUBLICATIONS

International Search Report and Written Opinion, PCT/US19/067275, Banerjee (international filing date Dec. 18, 2019).

*Primary Examiner* — James J Yang
(74) *Attorney, Agent, or Firm* — Wayne Edward Ramage; Baker Donelson (57) ABSTRACT

Devices and systems for environmental state estimation and decision-making, including an agent device with a plurality of internal sensors and a microprocessor with an agent program, configured to send and receive electronic communications to and from a plurality of external sensors and other agent devices. The agent device predicts the state of its environment at a time and location according to an internal model of the local environment, selectively samples the state of its environment at the time and location by receiving observations about objects and/or action in said environment, determines any environmental state prediction errors, determines the source or sources for any environmental state prediction errors; and updates its internal model. The agent device may initiate action based on its observations and/or predictions.

19 Claims, 5 Drawing Sheets

(51) Int. Cl.
*G06N 5/045* (2023.01)
*G06N 20/00* (2019.01)

(52) U.S. Cl.
CPC ............. *G06N 5/045* (2013.01); *G06N 20/00* (2019.01); *G08B 21/0469* (2013.01); *G08B 21/0476* (2013.01)

(58) Field of Classification Search
CPC ........ G06N 7/005; G06N 5/022; G06N 5/003; G06F 3/017; G06F 3/011
See application file for complete search history.

(56) References Cited

U.S. PATENT DOCUMENTS

| | | |
|---|---|---|
| 2017/0173262 A1* | 6/2017 | Veltz ...................... G16H 20/17 |
| 2017/0195475 A1 | 7/2017 | Mehta et al. |
| 2018/0325385 A1 | 11/2018 | Deterding |

* cited by examiner

MULTI-SENSOR DEVICE FOR ENVIRONMENT STATE ESTIMATION AND PREDICTION BY SAMPLING ITS OWN SENSORS AND OTHER DEVICES

This application claims benefit of and priority to U.S. Provisional Applications No. 62/780,973, filed Dec. 18, 2018, and No. 62/933,538, filed Nov. 11, 2019. The complete specifications, drawings, appendices and disclosures of U.S. Provisional Applications No. 62/780,973 and No. 62/933,538 are incorporated herein in their entireties by specific reference for all purposes.

FIELD OF INVENTION

This invention relates to a device, system and related methods for estimating, predicting and determining the state of an environment. More particularly, this invention relates to a multi-sensor device for estimating, predicting and determining the state of an environment through sampling its own sensors and other devices.

BACKGROUND OF INVENTION

An important problem in many monitoring applications, such as surveillance for ensuring safety, traffic monitoring, patient health and behavior monitoring, is for the concerned authorities to estimate and/or predict the state of the environment being monitored and take appropriate action. Typically, a myriad of sensors (static and dynamic) are used to monitor the environment, each of which sends its sensed signals/data to a central entity where algorithms and humans process all the data to infer the state of the environment and decide on actions. An example of this central decision-maker system is Google Maps traffic state estimation. It uses a central decision-maker (server) that receives data from three kinds of sources: static sensors in the streets; GPS data from Android smartphones; and crowdsourcing data through the Waze mobile device application. The estimated traffic state information is sent back to individual Google Maps users by coloring (red, yellow, green, and the like) the roads in the map display and notifying users of delays.

This centralized decision-maker has a presumably complete view of the space spanned by the sensors, hence it can predict the state at any location and time. However, it has some serious drawbacks. These drawbacks include the consumption of significant network resources due to transference of large volumes of data, and the fact that the central decision-maker acts as a bottleneck for processing this data (which is received frequently around-the-clock). For example, more than 50% of a typical university's internet bandwidth is used only for transferring video data from several hundred surveillance cameras in a main campus to the central server, which is accessible to law enforcement. Furthermore, extreme computational resources are required to process the video feed from this number of cameras and make decisions in near real-time. As a result, all responses to crime based on a central system like this are reactive as opposed to proactive. The resource requirements, bottle-necking and other drawbacks increase with the increase in number of sensors or data-providing device or things, which is inevitable as the "Internet of Things/Everything" continues to expand.

Accordingly, what is needed is an improved system and related methods and devices for estimating, predicting and determining the state of a multi-sensor environment or system in real-time or near real-time.

SUMMARY OF INVENTION

In various exemplary embodiments, the present invention comprises a system with multiple agents or sensors (including, but not limited to, devices, appliances or other "things" that can provide data relevant to environmental state), where each agent or sensor estimates and predicts the state of its environment by, among other things, communicating with other agents or sensors in the system. Embodiments of the present invention determines what, when, how, and with what/whom to communicate, which allows predictive, proactive action before any unintended situation occurs in the environment. In embodiments, each sensor or agent in the system is, and is modeled as, an autonomous agent with the ability to (1) sense its environment, (2) infer the causes of the sensed data (a.k.a. "explanation"), (3) perform at least two kinds of actions: selectively sample the environment and communicate with other agents, and (4) learn from the data and its explanation.

DETAILED DESCRIPTION OF EXEMPLARY EMBODIMENTS

In various exemplary embodiments, the present invention comprises a system with multiple agents or sensors (including, but not limited to, devices, appliances or other "things" that can provide data relevant to environmental state), where each agent or sensor estimates and predicts the state of its environment by, among other things, communicating with other agents or sensors in the system. As described below, the present invention determines what, when, how, and with what/whom to communicate, which allows predictive, proactive action before any unintended situation occurs in the environment.

In several embodiments, each sensor or agent in the system is, and is modeled as, an autonomous agent with the ability to (1) sense its environment, (2) infer the causes of the sensed data (a.k.a. "explanation"), (3) perform at least two kinds of actions: selectively sample the environment and communicate with other agents, and (4) learn from the data and its explanation. In some embodiments, an agent is anything that can be viewed as perceiving its environment through sensors and acting upon that environment through actuators. A percept is the agent's perceptual inputs at any given instant. An agent's percept sequence is the complete history of everything the agent has ever perceived. An agent function maps any given percept sequence to an action, thereby mathematically describing the agent's behavior. The agent function for an artificial agent is internally implemented by an agent program.

Predicting the state of an agent's (or sensor's) partially-observable environment is a problem of interest in many domains. Typically, a real-world environment comprises multiple agents, not necessarily working towards a common goal. Though the goal and sensory observation for each agent is unique, one agent might have acquired some knowledge that may benefit the other. In essence, the knowledge base regarding the environment is distributed among the agents.

An agent can sample this distributed knowledge base by communicating with other agents. Since an agent is not storing the entire knowledge base, its model can be small and its inference can be efficient and fault-tolerant. However, the agent needs to learn: (1) when, with whom and what to communicate in different situations, and (2) how to use its body to accomplish such communication.

Sensors or agents with these capabilities may be achieved by embedding or incorporating in a sensor a microprocessor or processor with WiFi and/or Bluetooth (or other near field communications or wireless communications), and installing and operating a system agent program in the microprocessor or processor.

In several embodiments, an agent 10 may be implemented as a device with multiple sensors 12 and actuators 14. Each agent may have a unique set of sensors and/or actuators, a unique environment, and a unique goal or goals. As used herein, the agent's "body" refers to the parameters for controlling the sensors and actuators. As described below, in various embodiments the present invention addresses how an agent may optimally communicate with other agents to predict the state of its environment, and how the agent learns and executes communication and other policies in a localized manner (i.e., the agent communicates neither with a central or global controller or decision-maker, nor with all other agents, all of the time). A "policy" of an agent is a function or mapping from the states to the actions.

Figure 1:
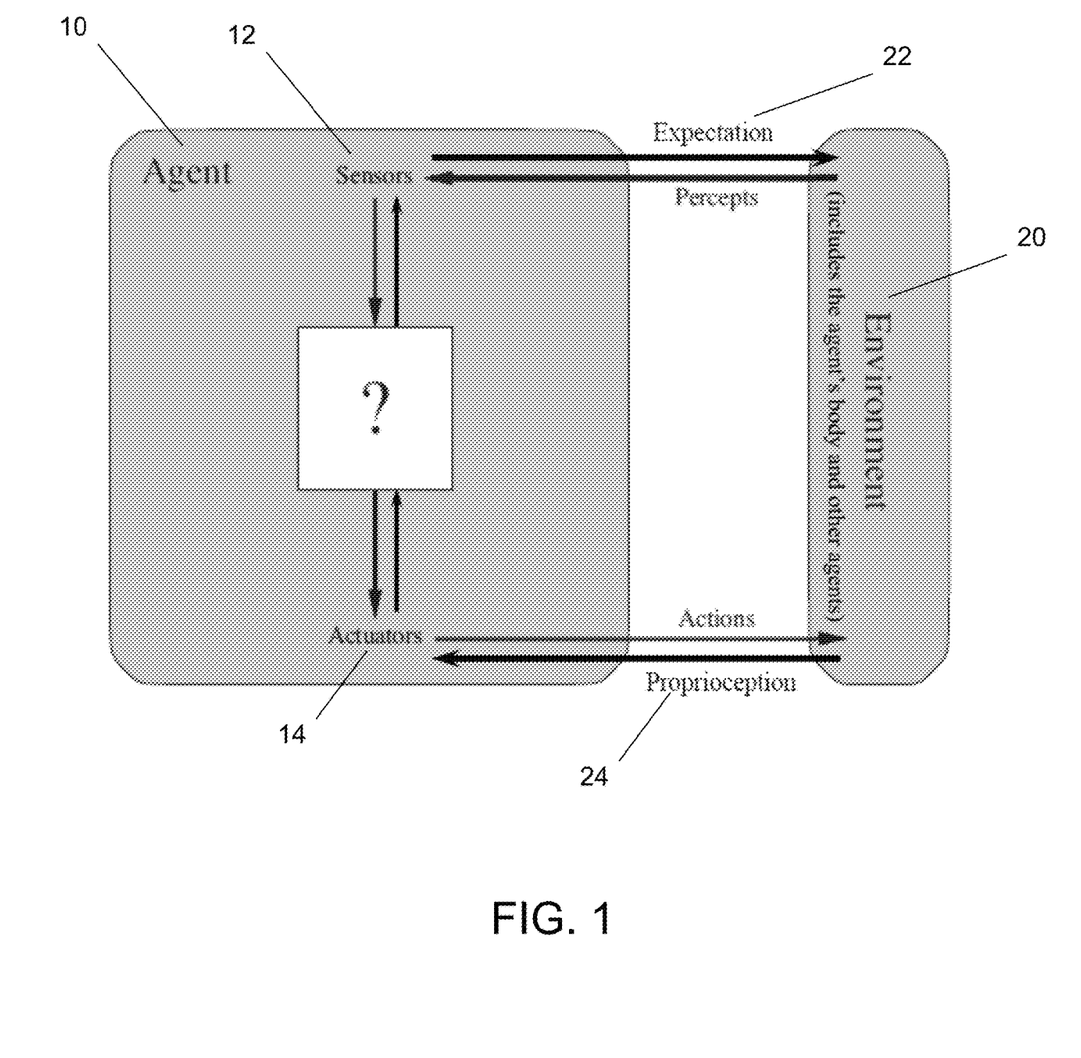
FIG. 1 shows a diagram of an agent's general interactions with its environment.

In the embodiment shown in FIG. 1, a particular agent's (referred to as the primary agent) 10 environment 20 includes its own body and other agents (which may be some or all other agents). The primary agent learns how to use its body and other agents to reach its goal state. The primary agent is predictive in nature. It has expectations about its sensory observations generated from the environment. Since the environment includes its own body, the agent has expectations 22 regarding how different parts of its body (e.g., actuators) will activate. These activations are fed back to the agent via proprioception 24. Since the environment consists of other agents, the agent has expectations regarding how the other agents will behave or act when presented with an observation. An observation can be generated by the natural environment or by one or more agents in the environment. The other agents' behaviors are fed back as observations to the agent via perception.

Figure 2:
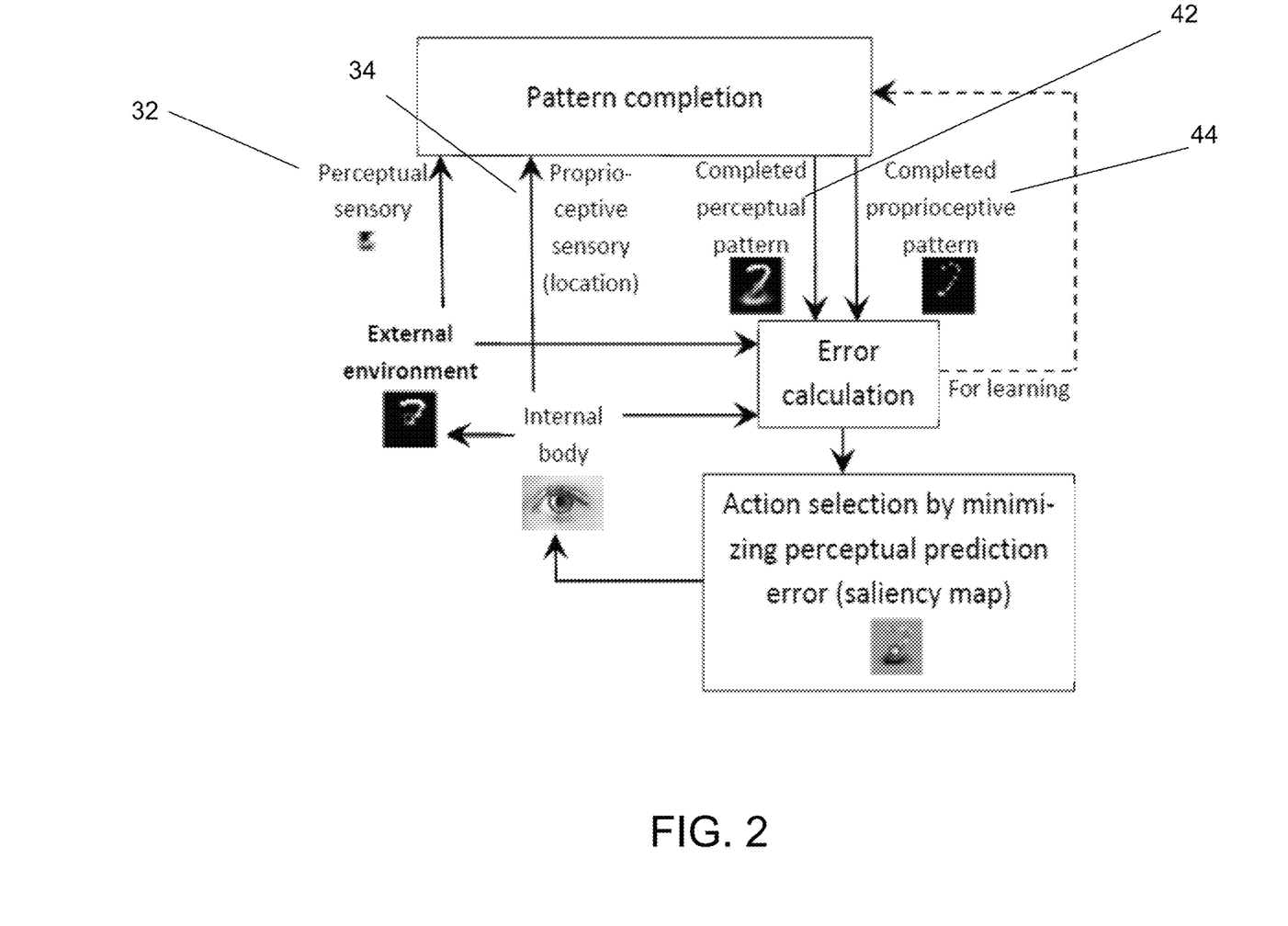
FIG. 2 shows a diagram of an exemplary architecture of an agent observing its environment using one sensory modality.

FIG. 2 shows an exemplary embodiment of the architecture of an agent that observes its environment using only one sensory modality (in this case, visual). This architecture is unique in several ways. First, the sensory modality comprises a perceptual 32 and a proprioceptive 34 pathway implementing a perception-action loop and an action-perception loop. Second, the perceptual 42 and proprioceptive 44 patterns are completed after each observation. And third, the perceptual prediction error provides the observation for proprioception, thereby allowing it to learn a policy without any reinforcement (reward/punishment) signal.

The problem of pattern completion for this predictive agent is defined as follows. At any time t, compute the probability distribution $P(e_1, e_2, \ldots, e_T)$, where $e_k$ is the k-th observation in a sequence, $i < j < t \leq T$, and $\{i, j, \ldots, t\}$ is a subset of $\{1, 2, \ldots, T\}$. That is, at any time t, the agent has to complete the entire sequence of observations given a subset of observations from that sequence.

The objective function optimized by this agent is its sensory prediction error. The objective can be stated in many ways. In non-probabilistic form, the objective is given by:

$$\text{Minimize}_{\{\theta, \alpha\}} \sum_{t=0}^{T-1} \|e_{t+1} - f_\theta(e_{t+1}, e_f, \ldots, e_t)\|^2 + \lambda g(\alpha_{t+1}),$$

where $\|\cdot\|^2$ denotes squared $l_2$ norm, $\hat{e}_{t+1} = f_\theta(e_i, e_j, \ldots, e_t)$ is the predicted observation for time t+1; $f$ is the prediction or pattern completion function with parameters $\theta$ and latent (or hidden) variables h, $\alpha_{t+1}$ is the representation of $\hat{e}_{t+1}$ in terms of latent variables h; g is a regularization function that imposes a sparsity constraint on a for better generalization (i.e., g penalizes model complexity such that less complex models are preferred over more complex ones); and A is used to adjust the relative importance of the prediction error and the regularizer. Unfortunately, solving this optimization problem is intractable in general. A number of approximations have been suggested in the literature with varying degrees of success. Any of those approximations can be utilized as the objective function for this predictive agent.

In probabilistic form, the goal is to learn a model distribution $p_{model}$ that approximates the true, but unknown, data distribution $p_{data}$. A widely-used objective is to maximize log-likelihood, $\log p_{model}(e|\theta)$, that estimates model parameters $\theta$ to maximize the likelihood of training data e. This is equivalent to minimizing the Kullback-Leibler (KL) divergence between data and model distributions:

$$\text{Minimize}_{\{\theta\}} D_{KL}(p_{data} \| p_{model}).$$

Other objectives have also been used such as the minimization of Jensen-Shannon (JS) divergence Des $(p_{data} \| p_{model})$ which is used in the generative adversarial network. Different objectives have different properties. Any reasonable objective can be utilized for this predictive agent.

For efficiency, the prediction/pattern completion can be accomplished as follows. Compute the distribution $P(e_{t+1}|e_1, e_j, \ldots, e_t)$, for time t+1. Using the prediction $e_{t+1}$, compute the distribution $P(e_{t+2}|e_i, e_j, \ldots, e_t, e_{t+1})$, then compute $P(e_{t+3}|e_i, e_j, \ldots, e_t, \hat{e}_{t+1}, \hat{e}_{t+2})$, and so on. Clearly, the distribution (e.g., Gaussian) will be sharper (lower standard deviation) and more accurate when predicting for time t+p than when predicting for time t+q where p<q, p>0.

The benefits of completing patterns in this way are two-fold: (1) variable length sequences can be computed (there is no need to assume a maximum length of the sequences); and (2) the prediction function $f$ will be simpler because it is always predicting the distribution for only one time instant in the future.

Figure 3:
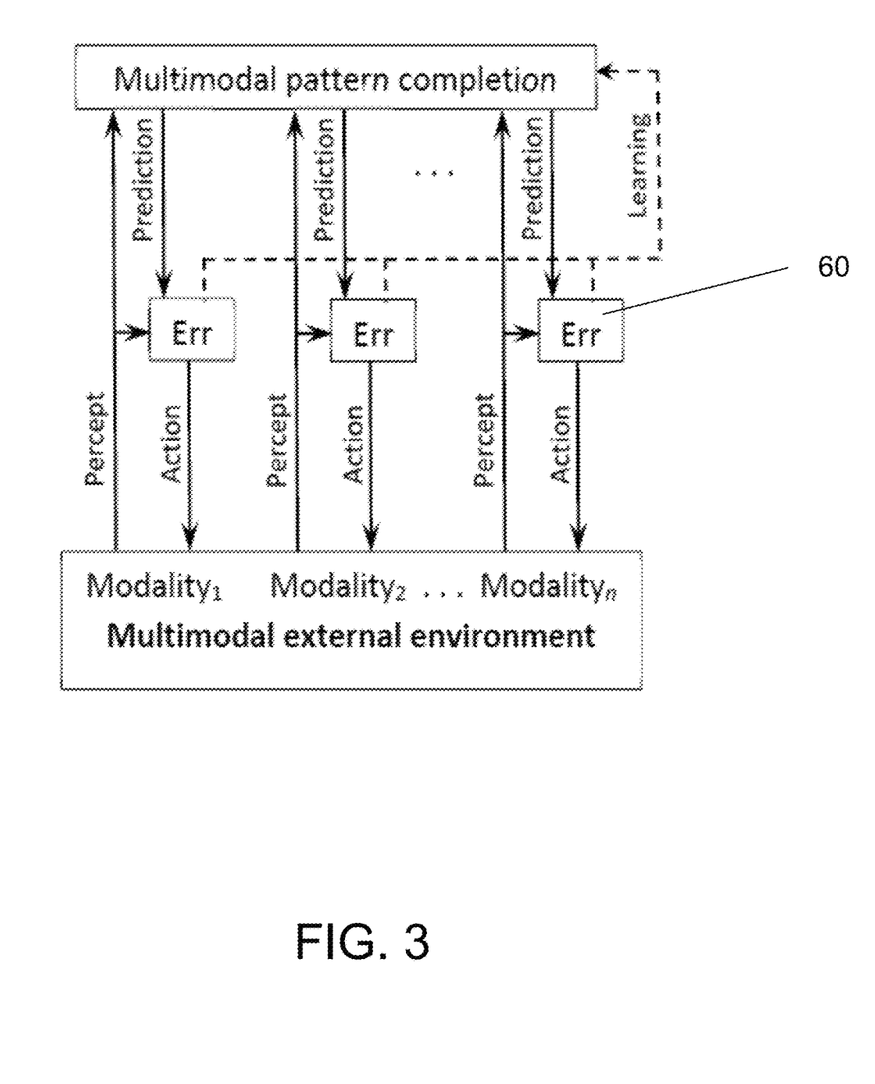
FIG. 3 shows a diagram of an exemplary architecture of an agent observing its environment using multiple sensory modalities.

FIG. 3 shows an exemplary embodiment of an agent that observes its environment using multiple (n) sensory modalities. "Err" 60 indicates the error calculation module (see FIG. 2). This architecture is a straightforward generalization of the agent architecture from FIG. 2 to multiple modalities, so all the unique properties of the agent architecture in FIG.

2 are present here as well. Each sensory modality comprises a perceptual and a proprioceptive pathway implementing perception-action and action-perception loops. The agent completes the perceptual and proprioceptive patterns jointly in all modalities after each observation. The errors from all modalities are jointly minimized via learning.

The objective of this multimodal architecture is to jointly minimize the prediction error from all modalities. Each modality has its own set of latent variables. Let $h_i$ be the set of latent variables for the i-th modality. Then the problem of jointly completing the pattern in, modalities requires learning the joint distribution $P(h_1, h_2, \ldots, h_n)$ which is an intractable problem. A number of approximations have been used in the literature, such as factorization and assuming specific classes of distribution (e.g., Gaussian). Such approximations can be used here as long as they are consistent with the data.

The agent is predictive, i.e., its goal is to learn an internal model of its environment such that it can accurately predict the environment at any time and location. Making inferences (predictive and causal), acting and learning are achieved by minimizing prediction errors. This can be conceptually understood as the SELP cycle whereby an agent interacts with its environment by relentlessly executing four functions cyclically: Surprise 110 (observe and compute prediction errors), Explain 120 (infer causes of surprise), Learn 130 (update internal model using the surprise and inferred causes), and Predict 140 (predict the next observation or expected input) (see FIG. 4).

Figure 4:
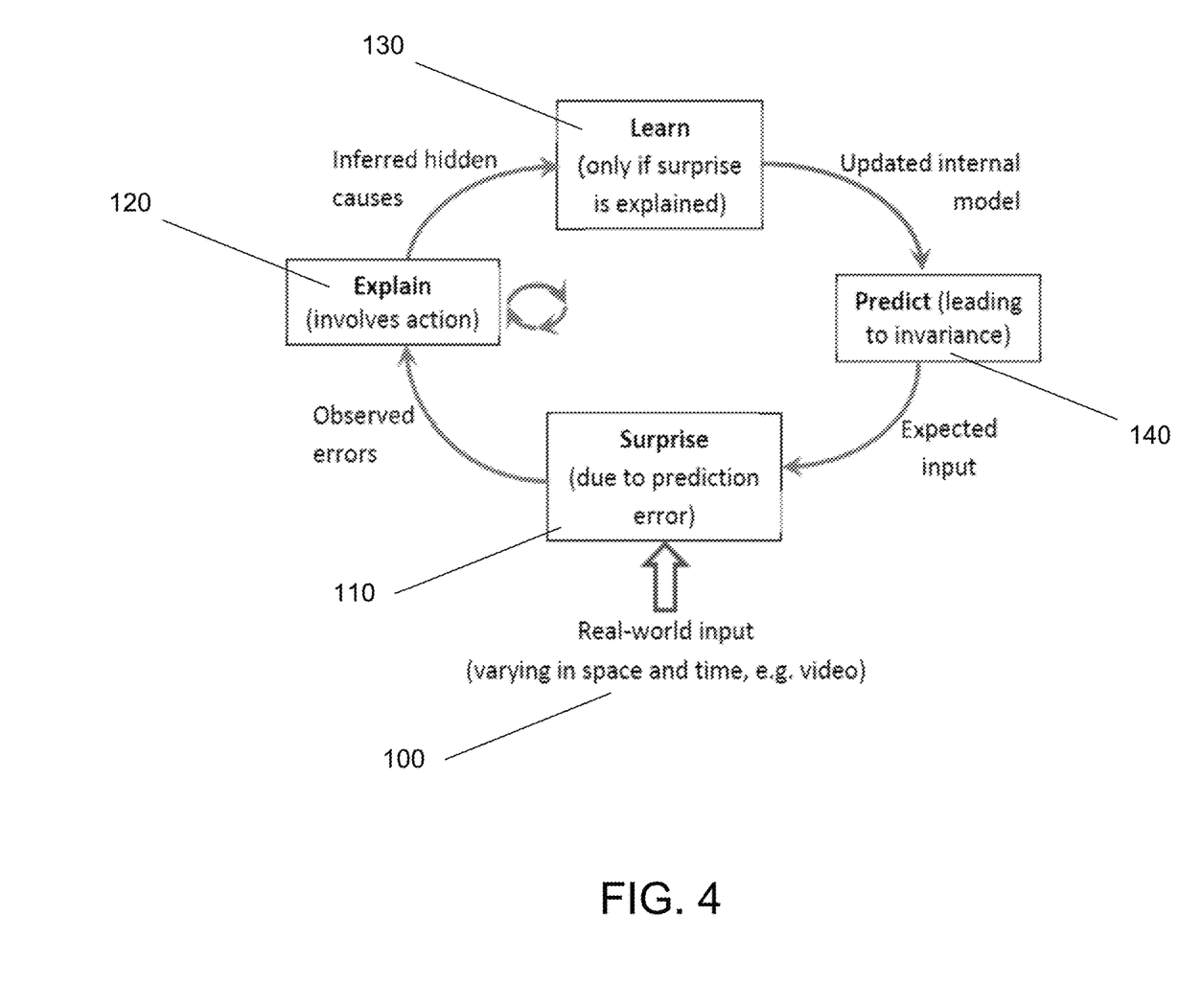
FIG. 4 shows a diagram of the SELP predictive operation of an agent for input data varying in space and time.

Using the SELP cycle, each agent learns a causal model of its environment and the interaction of its neighboring agents with the environment. This causal model allows it to predict the environment and the behavior of other agents within its field of view. When a prediction error occurs in the behaviors, the agent initiates a communication. The agent will communicate with that other agent who generated the highest prediction error. This is a greedy approach to minimizing total prediction error.

An agent initiates communication to minimize its own surprise and to maximize the other agent's surprise (otherwise the other agent might not respond). As response, an agent communicates to the other agent that part of the internal model that is related to but is maximally different from the content of the incoming communication; i.e., it points out where the other agent's prediction is most incorrect instead of explaining everything. This is a greedy approach to minimizing total message size and hence communication bandwidth.

The internal model is generative. It is implemented as a probabilistic graphical model that represents the joint distribution of the observable and hidden variables. At any time, the values of the observable variables constitute the data or observation. During communication, a partial observation (i.e., values of a subset of observable variables) is passed on from one agent to another. Then the receiving agent has to figure out how this observation can be generated using its own internal model without creating a conflict with any prior observations. If it can figure out, it updates its internal model (a.k.a. learning).

FIG. 4 shows an exemplary embodiment of the SELP predictive operation of the agent for input data 100 varying in space and time. It assumes that any real-world data generally is observed in parts and seldom in its entirety. For data varying only in space (e.g., an image), it is observed using a sequences of glimpses. Hence the observations appear in a sequence in the same way as in time-varying data. Thus, this prediction cycle applies to both data that does and does not vary with time.

As discussed above, pattern completion has been formulated as an optimization problem. At any time t, the goal of pattern completion is to compute the probability distribution:

$$P(e_1, e_2, \ldots, e_T | e_i, e_j, \ldots, e_t) = \Sigma_{h_1, h_2, \ldots, h_n} P(e_1, e_2, \ldots, e_T | e_i, e_j, \ldots e_t, h_1, h_2, \ldots, h_n) P(h_1, h_2, \ldots, h_n)$$

which is an intractable problem. The prediction cycle searches the space of observable and latent variables efficiently.

In general, any relatively complex real-world observation is composed of simpler and smaller observations, each of which varies in space and/or time. In order to explain such a complex observation, many of the smaller ones need to be inferred first. The time-varying observations are inferred by prediction, while the stationary observations are inferred by explanation. In the case of stationary observations, prediction is useful to infer invariance to different transformations. Assume a multilayered neural network model with such neuronal receptive fields that observations over space and time are stationary to neurons in a layer while the same observations are non-stationary (i.e., vary over space and time) to neurons in its lower layer. Since efficiency is key, lower layers are recruited opportunistically to infer smaller observations by explanation and/or prediction.

To understand this efficiency, consider for example the task of explaining the objects and actions in an environment by an event. Suppose an environment being observed consisting of multiple objects, such as chairs, tables, humans, foods and drinks, and different actions being performed by them or on them. Depending on the actions, this could be one of the two events: i.e., dining or partying. Since the task is explanation, the simple sublayer in a layer $L_i$ (i-th layer in the multilayered model) will be recruited to make the inference as soon as possible, i.e., efficiency is a key concern. The receptive field (RF) of neurons in $L_i$ is such that the observations over space and time are stationary. However, RFs of neurons in lower layers are such that the same observations are non-stationary, i.e., they vary over space and time. It is the task of these lower layers to explain and predict the objects and actions such that the neurons in $L_i$ can make the inference in the most efficient manner.

In this example, it is important for $L_i$ to have the information whether dancing is one of the actions in the observed environment since dancing is a discriminative feature between dining and partying. Hence, $L_i$ dictates a lower layer $L_j$, j<i, to make that inference. Since efficiency is key, the complex sublayer in $L_j$ along with lateral connections in the simple sublayer will predict every instance of a person's movement only until his action is inferred when it will be reported to $L_i$. This operation will require $L_i$'s explanation cycle to employ $L_j$'s prediction cycle within it. $L_j$'s prediction cycle runs on a faster time scale than $L_i$'s explanation cycle. Also, $L_j$'s prediction cycle has to employ a lower layer $L_k$'s (k<j) explanation cycle in order to infer a set of light intensities as a human. $L_k$'s explanation cycle runs on a faster time scale than $L_j$'s prediction cycle.

In several embodiments, this opportunistic recruitment is referred to as an action which is not limited to recruiting lower layers, but also extends to recruiting sensors (using appropriate actuators) and other agents (via communication). With regard to recruitment of sensors, each sensor has a model which is learned by the agent using the objectives discussed before. At any time, that sensor (or modality) is chosen that maximizes the information content in the signal.

This is achieved using the agent model described above (see FIGS. 2 and 3) whereby the agent samples the location (in this case, a sensor or modality) generating the highest prediction error.

With regard to recruitment of other agents, each of the other agents has a model which is learned by the primary agent using the objectives discussed above. At any time, that other agent is chosen which maximizes the information content in the signal. This is achieved using the agent model described above (see FIGS. 2 and 3) whereby the primary agent samples the location (in this case, another agent) whose behavior for a particular observation is generating the highest prediction error from the perspective of the primary agent.

Figure 5:
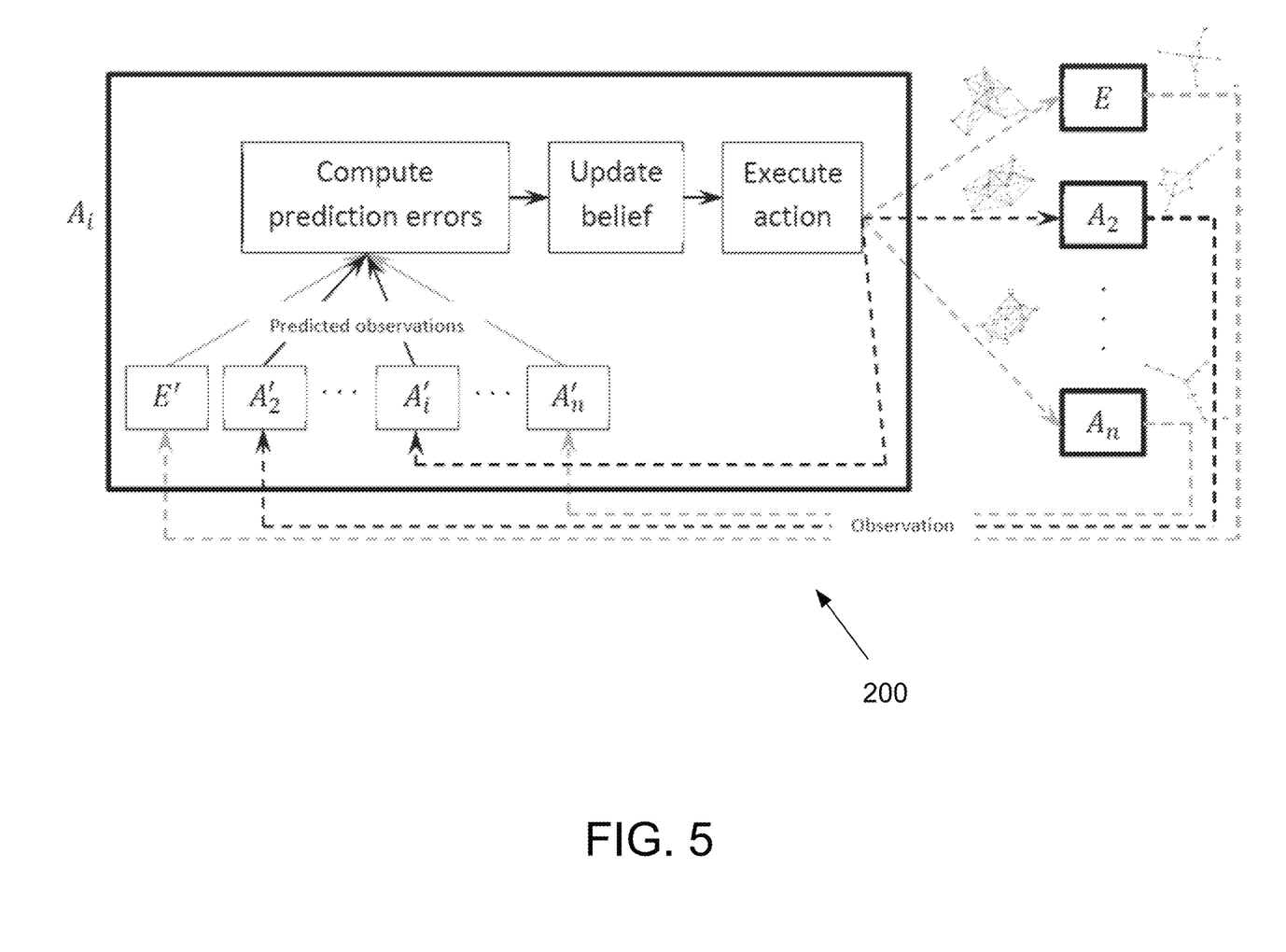
FIG. 5 shows a diagram of the Explanation cycle of FIG. 4.

FIG. 5 shows a detail of the explanation cycle 200 from the SELP cycle of FIG. 4. Communication between an agent $A_i$ and other agents $\{E, A_2, \ldots, A_n\}$ is shown, where E is the environment (treated as an agent), partially observable to all communicating agents. The internal architecture of $A_i$ is shown. The dotted/broken lines with arrows indicate directed communication links. The black (darker) lines indicate the chosen path for flow of information while the grey (lighter) lines are the alternative paths. Each agent's knowledge (or internal model) comprises models of all agents, including its own model. For ease of depiction, each agent $A_j$'s model in $A_i$ is shown separately, denoted by A However, since all agents share similarities, they may be represented efficiently using a single model which can be implemented as a hierarchical probabilistic graphical model. All agents have similar architecture except that their sensors for observing E and/or their actuators may be unique. At any time instant, an agent predicts the environment as well as the behavior of all agents within its perceptual field. The prediction error is used to update the belief of the state of the environment and all the agents. Based on this belief, the agent acts by sampling the environment or another agent's internal model to further minimize prediction error. This cycle continues until all surprises (e.g., due to prediction errors) have been explained; then the agent learns.

In various exemplary embodiments, the present invention possesses significant advantages over the prior art, including, but not limited to, the following:

1. Significantly less network resources are consumed due to significantly less data transfer to and from the sensors.

2. There is no central bottleneck for processing the data generated by the sensors. Hence, decision-making is significantly more efficient, i.e., faster and requiring less computational resources (processor, memory, storage space, and the like).

3. If a sensor malfunctions or stops functioning, its neighboring sensors can detect that problem. If the neighboring sensors have overlapping fields of view with this sensor, they can fill in its place. This makes the entire system fault-tolerant.

4. Each sensor in the system is an autonomous agent with the ability to sense, make causal inferences, act, and learn. Thus, the sensors can independently contact concerned authorities when certain events occur. For example, a thermostat sensor/agent can contact the appropriate fire department in the event of a fire (e.g., detection of an abnormal rise in temperature) when no one is at home or everybody is asleep.

5. Each sensor (agent) is predictive, so proactive action can be taken before any unintended situation occurs in the environment.

The present invention can be used in a wide variety of systems or applications, including but not limited to the following:

1. Monitoring the state of traffic (i.e., by a Dept. of Transportation, or mapping application such as Google Maps).

2. Law enforcement/police department, such as for monitoring an officer's own personal environment for safety when in a potentially unsafe location or situation.

3. Military (e.g., head gear for situational awareness).

4. Patient monitoring in a hospital, ICU, nursing home, residential care facility, or healthcare facility.

5. Veterans Administration healthcare system (e.g., monitoring suicide prone veterans).

6. Safety monitoring of public or private areas (e.g., schools, offices, theaters, airports, shopping malls, or other locations with possibility of crime, mass shootings, or the like).

7. Border monitoring.

8. Individually-worn devices (for safety monitoring of the individual or those nearby).

An example of an individually-worn device comprises a novel "SmartCap" comprising a cap, hat, or other form of headgear with multiple sensors as described herein for monitoring the individual and the individual's environment for safety or other reasons. In general, the SmartCap comprises a processor or microprocessor with Bluetooth and/or Wi-Fi wireless and/or cellular network communications and various sensors (e.g., cameras, microphones, gas sensor, temperature/pressure/humidity sensors, smart health sensors (such as heartrate, body temperature, blood pressure), and so on). In some embodiments, the SmartCap may also communicate with individual health sensors that are located elsewhere on (or in) the individual (e.g., a band or smartwatch that detects blood pressure and pulse rate; a pacemaker with communications capability, and so on).

SmartCaps can communicate with each other, as well as with smartphones, mobile computing devices, computer networks, and other computing devices. For example, data can be communicated by a SmartCap to appropriate individuals or persons (e.g., security personnel, the user's family members, friends, or designated recipients or contacts). A SmartCap may be used for monitoring individuals with mental illness who manifest aggressive behavior from time to time, along with their environment. A criminal under house arrest or limited mobility (as ordered by the court) and his environment can be monitored by the law enforcement or family members if the criminal is required by law to wear a SmartCap (or other wearable device with SmartCap elements). Further, since SmartCaps can communicate, they can be used for crowdsourcing the state of traffic (replacing the role of humans in the Waze application) at current locations and times, which will help to predict traffic state and avoid congestion. SmartCaps can also crowdsource other data, such as the price of gas at a location and time (thus replacing the role of humans in GasBuddy.com).

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like. Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like. Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data. Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A system for environmental state estimation and decision-making, comprising:
   a plurality of agent devices, each with microprocessors with agent programs, said plurality of agent devices comprising a first agent device;
   said first agent device comprising a plurality of internal sensors and a first agent microprocessor with a first agent program, wherein the first agent device is configured to send and receive electronic communications to and from a plurality of external sensors and said plurality of agent devices;
   wherein the first agent device agent program is configured to:
      predict the state of its environment at a time and location according to a first agent device internal model of the environment, wherein said environment comprises the first agent device and at least one other agent device from said plurality of agent devices;
      selectively sample the state of its environment at the time and location, wherein said sampling comprise receiving observations about objects, actions, and events in said environment;
      determine any environmental state prediction errors;
      determine the source or sources for any environmental state prediction errors; and
      update the first agent device internal model based upon the environmental state prediction errors and the determined source or sources of prediction errors;
   further wherein the first agent device agent program selectively samples by receiving observations from multiple sensory modalities comprising at least its own internal sensors, one or more external sensors in said plurality of external sensors, and one or more other agent devices in said plurality of agent devices;
   further wherein each sensory modality from said multiple sensory modalities comprises a perceptual pathway and a proprioceptive pathway implementing a perception-action loop and an action-perception loop;
   further wherein perceptual patterns and proprioceptive patterns are completed after each observation;
   further wherein prediction errors related to said perceptual patterns provide the observation for proprioception, whereby the first agent device agent program learns a policy without any reward-based or punishment-based reinforcement signal;
   further wherein each agent device in said plurality of agent devices is an autonomous agent device able to independently initiate communications;
   further wherein the first agent device is not in communication with a central controller, entity, or decision-maker;
   further wherein there is no central bottleneck or decision-maker for processing data generated by the plurality of agent devices; and
   further wherein each agent in said plurality of agent devices has knowledge of its local environment, the sum of each agent's knowledge collectively forming an environmental knowledge base, said environmental knowledge base distributed among the agents in said plurality of agent devices, wherein no agent stores the entire environmental knowledge base.

2. The system of claim 1, wherein the first agent device agent program is further configured to initiate an action.

3. The system of claim 1, wherein the first agent device agent program is not in continued or extended communication with all of the other agent devices with microprocessors with agent programs.

4. The system of claim 1, wherein the first agent device agent program and the other agent devices with microprocessors with agent programs are not programmed to achieve a common goal.

5. The system of claim 1, wherein the first agent device agent program selects one or more internal sensors from which it received observations to infer further observations.

6. The system of claim 5, wherein the first agent device agent program selects one external sensor based on the sensor generating the highest prediction error.

7. The system of claim 1, wherein the first agent device agent program selectively recruits one or more other agent devices from which it received observations to infer further observations.

8. The system of claim 7, wherein the first agent device agent program selectively recruits one other agent device based on the other agent device whose behavior for a particular observation generates the highest prediction error.

9. The system of claim 1, wherein the first agent device is configured to be worn by a person.

10. The system of claim 9, wherein the first agent device comprises a camera, a microphone, a gas sensor, and one or more ambient temperature, pressure or humidity sensors.

11. The system of claim 9, wherein the first agent device comprises a heartrate monitor, a body temperature monitor, and/or a blood pressure monitor.

12. The system of claim 9, wherein the first agent device is in communication with one or more secondary individual sensors or devices also located on the individual.

13. The system of claim 12, wherein the secondary individual sensors or devices comprise one or more of a health fitness band, a smartwatch, and a pacemaker.

14. The system of claim 1, wherein the first agent device is a wristband or watch.

15. The system of claim 1, wherein the first agent device is worn on an extremity of the human body.

16. The system of claim 2, wherein the action initiated comprises one or more of:
   contacting an appropriate authority;
   contacting an owner of a property or business;
   contacting an appropriate fire department;
   contacting an appropriate police department;
   contacting a security guard; or
   contacting a health care professional.

17. The system of claim 2, wherein the action initiated is proactive, based upon a prediction made by the first agent device agent program.

18. The system of claim 1, wherein the first agent device agent program operates to jointly minimize errors from all multiple sensory modalities.

19. The system of claim 9, wherein the first agent device is a cap or hat comprising a microprocessor, wireless and/or cell network communications modules, at least one camera, a microphone, a gas sensor, an ambient temperature sensor, an ambient pressure sensor, and an ambient humidity sensor, and one or more health-related sensors, further wherein the first agent device is also in communication with one or more individual health sensors located elsewhere on or in an entity wearing the first agent device.

* * * * *